Figure 1:
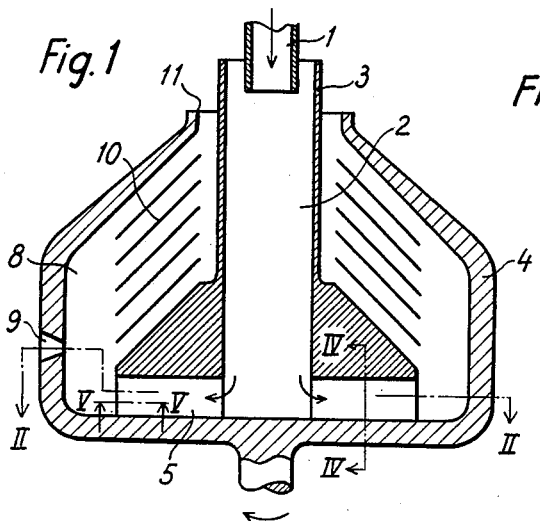

June 4, 1963

S. H. B. ZACHARIASSÉN 3,092,584

CENTRIFUGAL SEPARATION OF LIQUIDS CONTAINING
FLOCCULATING SLUDGE
Filed Nov. 22, 1960

INVENTOR.
Stig Holger Bjarne Zachariassén
BY
Davis, Hoxie, Faithfull + Hapgood
Attorneys United States Patent Office 3,092,584
Patented June 4, 1963

3,092,584
CENTRIFUGAL SEPARATION OF LIQUIDS CONTAINING FLOCCULATING SLUDGE
Stig Holger Bjarne Zachariassén, Stockholm, Sweden, assignor to Aktiebolaget Separator, Stockholm, Sweden, a corporation of Sweden
Filed Nov. 22, 1960, Ser. No. 71,051
Claims priority, application Sweden Dec. 8, 1959
1 Claim. (Cl. 233—32)

Separation of liquids containing flocculating sludge, in centrifuges with high speed of rotation, has always presented great difficulties because the flocks are easily broken by the strong turbulent flows arising in the rotating separator bowl.

This invention relates to improvements in the centrifugal separation of liquids to which flock-forming agents have been added for purification of the liquids. The purpose of these flocks is that they in themselves collect and bind colloidal impurities in the liquid which later can be separated out together with the flocks because their specific gravity is higher than that of the liquid, which heretofore has been effected almost exclusively by means of gravity separators of one type or other.

As examples of liquids purified in this way may be mentioned common waterworks water which is purified by adding an agent such as aluminium sulphate or chloride, and the alkaline water which in waterworks is added to the waterworks water in order to adjust its pH and which is prepared by adding lime and separating off the lime-flocks. Another example is sugar juice in sugar factories, which is purified by adding $SO_2$ or $CO_2$, in which also a very brilliant final product is desired by separating out the produced flocks in a suitable way.

These flocks which are formed in the liquid are in general very fragile and great care must be taken during the liquid flow so that such whirl-formations as can break the flocks are avoided. For this reason, rapid flow of the liquid is avoided. A high speed is not per se detrimental if the motion is laminar, but it is apt to cause strong whirls at the channel walls, whereby the flocks are broken. Thus, as a rule a maximum speed has been fixed for the liquid, which in gravity separation must not be exceeded in order that the flocks should not be broken. This speed is to some degree dependent upon the quality of the flocks since flocks of stronger composition can stand a higher speed.

If such liquids are to be separated in a centrifugal separator, care should also be taken that a certain speed should not be exceeded and that whirl-formations are avoided.

A high speed involves a reduction of the size of the flocks and as flocks of the same size as in gravity separation of course are not necessary in a centrifugal separator with its extremely strong separating efficiency, somewhat higher speeds may be allowed in centrifugal separators. Whereas in gravity separation the maximum speed allowed for aluminium flocks is 0.3 m./sec. and for lime flocks about 0.5 m./sec., speeds up to approximately 4 m./sec. may be allowed in a centrifugal separator.

It is of course simple to dimension the through-flow areas in a separator in such way that the average speed is below the above-mentioned value. In machines of the design hitherto known it has proved difficult, however, not to say impossible, to accelerate the liquid, without strong whirl formation and without exceeding allowed maximum speeds, on its way from the centre of the centrifuge where the speed is near 0 m./sec. to the high peripheral speed which exists at the inlet of the separation chamber and which can amount to 150–200 m./sec. The invention has for an object to remove this inconvenience.

The present invention relates to centrifugal separation of liquids containing flocculating sludge and the principal characteristic of the invention is that the number of substantially radial liquid channels connecting the central inlet chamber in the distributor of the centrifuge to the separation chamber, and their height as projected on the centrifugal axis, are determined in such a way that the pressure which the liquid in each channel exerts on the channel wall and which is required for complete entrainment of the liquid during its passage through the channel in the radial direction from the distributor to the separation chamber will be smaller than that corresponding to a liquid speed of 4 m./sec. This condition is met in a centrifuge if $NH > \frac{1}{4}Qw$, where N is the number of radial channels, H is the axial height in metres of the channels, Q is the liquid throughput in m.$^3$/sec. of the centrifuge and $w$ is the angular speed in 1./sec. of the centrifuge.

Thus, the invention leads to the height of the vanes being increased and their number being very large, more than 20 up to 50 or >100. In the designs hitherto known, the purpose of the vanes has primarily been to entrain the liquid so as to obtain complete entrainment, and thereby unnecessary pressure losses arise during the passage of the liquid through the separator. For this purpose 4–8 vanes are sufficient and a number somewhat higher than 8 has not proved to involve any advantage worth mentioning. Besides, no vital importance has so far been attached to the height of the vanes.

This invention therefore implies a completely new method of operating centrifugal separators of a specific design.

The invention has its greatest importance for sludge centrifuges which are provided with means for continuous discharge of the sludge at its periphery. The higher the throughput of the centrifugal separator is, the greater are the acceleration forces upon the liquid, and the invention will thus be absolutely necessary for centrifugal separators with high throughput, i.e. at separators having a throughput above 5–10 m.$^3$/h. In the above-mentioned sludge separators with continuous sludge discharge, the liquid quantity supplied is large because a certain constant quantity of liquid must always be supplied to the nozzles to keep them filled with liquid.

In order to facilitate the understanding of the invention it is necessary to observe the liquid flow through the separator bowl, and below an elementary mathematic reasoning is presented which quite clearly shows the significance of the invention, reference being made to the accompanying drawings.

Figure 3:
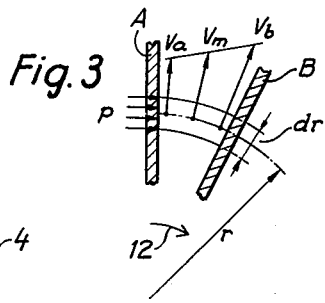
Figure 2:
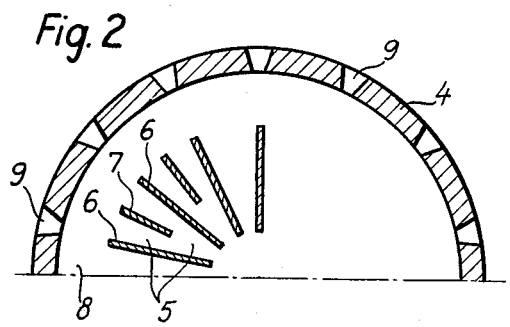
Figure 4:
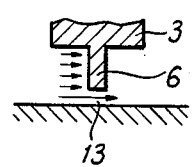
Figure 5:
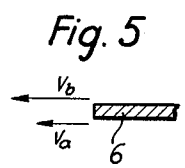
Figure 6:
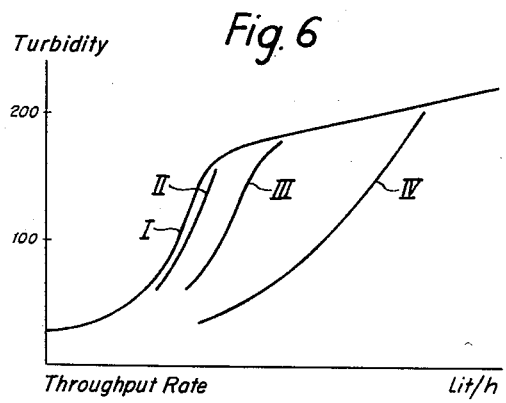

FIG. 1 shows schematically a vertical section through a centrifuge according to the invention and FIG. 2 a section of FIG. 1 along line II—II, while FIG. 3 on a larger scale shows a section of a channel which connects the distributor of the centrifuge to the separation chamber, FIGS. 4 and 5 a section of parts of FIG. 1 along the lines IV—IV and V—V, respectively, and FIG. 6, finally, a diagram.

In FIG. 1, reference numeral 1 designates the inlet pipe which supplies the liquid to be separated. From feed pipe 1 this liquid is introduced into the central chamber 2 in the distributor 3 which rests against the bottom in the rotatable centrifugal bowl 4. From the chamber 2 the liquid is led by means of the centrifugal force through the radial channels 5, formed between a series of vanes 6—7, to the separation chamber 8. In the separation chamber the liquid is divided up into flock-forming sludge and some liquid, which owing to higher specific gravity is ejected through the nozzles 9 at the peripheral wall of the bowl, and into purified liquid which owing to its lower specific gravity discharges through the disc set 10 over the overflow outlet 11. In the interspaces of the disc set the finest sludge is separated from the liquid, which sludge has not had time to be removed earlier. Inserted between the vanes 6 are shorter vanes 7 in order to reduce the distance between the outer parts of the diverging radial vanes and to increase the number of channels.

The object of the walls formed by vanes 6—7 in the channels 5 is to entrain the liquid so that, when entering the sludge chamber 8, it has approximately the same peripheral speed as the wall of the bowl if the diameter is the same.

What takes place between two channel walls or vanes 6, 6 or 6, 7 is illustrated in FIG. 3 which shows a liquid element moving radially outwards at a speed $v_m$. On its way outwards, the element is subjected to an acceleration called the Coriolis-acceleration which in fact is the acceleration required to enable the element to be completely entrained with the rotational speed of the bowl at the same radial distance from the centrifugal axis. The direction of rotation appears from the arrow 12. As a consequence of the acceleration an additional pressure will be produced on the channel wall A, which so to speak pushes the element. For the sake of simplicity the element is for a short time regarded as a solid body. The expression for the Coriolis-acceleration is the double product of the radial speed $v_m$, as measured at right angles to the axis of rotation, and the angular speed $w$ of the bowl. According to Newton's law a power is required to accelerate the element, which is equal to the product of the mass and the acceleration. This power is produced by the surface pressure on the channel wall A which is designated by $p$ kg./m.$^2$. If the channel walls are regarded as infinitely thin the following equation is thus obtained:

$$pHdr = \frac{2dr2\pi rH}{Ng} \cdot \gamma \cdot \frac{Q}{8\pi rH} \cdot w \quad (1)$$

where
$H$=the channel height in metres as measured in a direction parallel to the axis of rotation
$dr$=the radial length of the liquid element in metres
$r$=the distance in metres of the liquid element from the axis of rotation
$\gamma$=the specific gravity of the liquid in kg./m.$^3$
$N$=the number of channels
$g$=the earth acceleration in m./sec.$^2$
$Q$=the liquid quantity in m.$^3$/sec. fed to the bowl
$w$=the angular speed 1./sec. of the bowl The additional pressure on the channel wall will thus be:

$$p = \frac{2\gamma Qw}{NgH} \quad (2)$$

The total pressure of the liquid is composed of the average pressure of the liquid and the pressure increase resulting from the Coriolis-acceleration, and from the above it appears that the total pressure at the channel wall A succeeding in the direction of rotation must be higher than the pressure at the preceding channel wall B. Applicable, however, is also Bernoulli's energy law which in simplified form reads as follows:

$$\frac{P_{tot}}{\gamma} + \frac{v^2}{2g} = \text{const.} \quad (3)$$

in different points of the liquid element where $v$ is the total flow speed in m./sec. of the liquid.

As a result of this law the total speed of the liquid must be higher at the channel wall B than at the channel wall A and, the liquid having a total speed mainly in the direction along the channel wall, the total speed $v_b$ at the channel wall B will thus be higher than the speed $v_a$ at the channel wall A.

The difference of $v_b - v_a$ is dependent upon the surface pressure $p$ and is determined by the equation $$\frac{v_b^2}{2g} - \frac{v_a^2}{2g} = \frac{p}{\gamma} \quad (4)$$

$v_b$ will thus lie above and $v_a$ below the average speed $v_m$. In order to get a more clear idea of the difference between the speeds, $v_b$ is calculated by means of the Equations 2 and 4 on condition that $v_a$ is 0 and the expression for $v_b$ is a speed which is called $v_1$ and constitutes:

$$v_1 = 2\sqrt{\frac{Qw}{NH}} \quad (5)$$

If the speed varies linearly with the distance from $v_a$ to $v_b$, $v_m$ is the average value of $v_a + v_b$.

To get an idea of the size of the higher speed $v_b$ it may be assumed that it is composed of $v_m$+half $v_1$, which is correct only if $v_a$ is 0 and the speed changes linearly from $v_a$ to $v_b$ with the distance in the direction of the tangent. This expression is called $v_{max.}$ and gives a good idea of the total maximum speed which can be produced when the liquid flows in the channel. The equation for $v_{max.}$ will thus be:

$$v_{max.} = v_m + \frac{v_1}{2} \quad (6)$$

For $v_m$ the following expression applies if the thickness of the channel walls are neglected and the speed is assumed to be equal in all the channels $$v_m = \frac{Q}{2\pi rH} \quad (7)$$

It may be said that the above calculation is made so as to illustrate in a suitable way the flow process in the channel and the calculation applies only as an approximation which will be exact in a friction liquid only when a number of channels tends to an infinite value.

To get an idea of the invention, $v_m$, $v_1$ and $v_{max.}$ are to be calculated for an actual separator. Assume a separator with the angular speed 628 1./sec., which corresponds to a speed of 6000 r.p.m., assume also that the vanes are observed on a radius of 0.15 m. and that their height as projected on the axis of rotation is 0.015 m. Further, $v_1$ and $v_{max.}$ are calculated for a normal number of 8 vanes or channels and for a number of 128 vanes according to the invention. The following table gives the values obtained for the speed.

*Table*

| $Q$ m.$^3$/sec. | $Q$ l./h. | $v_m$ m./sec. | $v_1$ 8 vanes m./sec. | $v_1$ 128 vanes m./sec. | $v_{max.}$ 8 vanes m./sec. | $v_{max.}$ 128 vanes m./sec. |
|---|---|---|---|---|---|---|
| 0.001 | 3,600 | 0.07 | 4.55 | 1.14 | 2.34 | 0.64 |
| 0.002 | 7,200 | 0.14 | 6.45 | 1.61 | 3.36 | 0.94 |
| 0.004 | 15,400 | 0.28 | 9.13 | 2.28 | 4.86 | 1.42 |
| 0.01 | 36,000 | 0.70 | 14.4 | 3.60 | 7.90 | 2.50 |
| 0.015 | 54,000 | 1.06 | 17.70 | 4.42 | 9.91 | 3.27 |

From this table the rather sensational result appears that $v_1$, especially with 8 vanes and even with 128 vanes, is considerably greater than $v_m$. As $v_1$ is greater than $2 \times v_m$, $v_{max.}$ becomes smaller than $v_1$, which in linear speed distribution results in the speed $v_a$ at the channel wall A being negative. As a matter of fact such a negative inward liquid movement does exist in such channels.

It is complicated to survey the actual flow process with a liquid which is not friction-free but, summing up, the following may be stated:

To accelerate the liquid to that rotational speed which the bowl wall has when the liquid enters the separation chamber, the channel wall must exert a pressure on the liquid of a size according to Equation 2 which indicates the additional pressure or the pressure difference between the pressures at the channel walls A and B. In fact it does not matter what speed distribution is applied in the various parts of the element. A certain quantity of liquid must flow through the channels and thus a certain quantity of liquid per unit of time must be accelerated and this requires a certain power which is determined by Newton's law. This power can only be produced from the pressure on the channel wall and thus a fixed power is required on the channel wall to obtain a complete entrainment of the liquid. If the power distribution on the channel wall is uniform over all its parts, which is an acceptable approximation, the pressure on the channel wall will be according to Equation 2. According to Bernoulli's equation, there must, owing to the pressure difference, be a speed difference between the liquid speed at the channel walls A and B. If the speed at the channel wall A is 0, the speed at the channel wall B will be equal to $v_1$. If the speed at the channel wall A is negative, the speed $v_b$ at the channel wall B according to Equation 4 will in fact be somewhat higher than $v_1$. A high negative speed is not possible, however, since it would manifest itself in great pressure losses during the liquid flow through the bowl and gives thus the expression for $v_1$, a good approximation for the obtainable maximum flow speed. From the table it appears how $v_1$, if a suitable number of vanes is chosen, can be reduced and if the number of vanes is chosen so that $v_1$ is below 4 m./sec., the maximum speed may be reckoned not to be higher than this speed which can be said to be the limit value for the speed if the flocks should not be broken by the turbulence at the wall.

To comply with the above-mentioned presupposition the condition is as follows:

$$4 > 2\sqrt{\frac{Qw}{NH}} \qquad (8)$$

Hence appears that the product NH must be $$> \frac{Qw}{4} \qquad (9)$$

As a matter of course the speed difference between $v_b$ and $v_a$ gives also a speed gradient which is detrimental to the flocks. If therefore $v_1$ is reduced, also this speed gradient is reduced so that a satisfactory flow process is obtained. Thus, it may be said that with an increased number of vanes there is obtained a more uniform speed distribution throughout the flow cross-section and thereby the maximum speed is reduced and turbulence is avoided. A smaller number of vanes gives a very ununiform speed distribution, whereas an endless number of vanes gives a completely uniform distribution which is determined by Equation 7 for $v_m$.

It may be mentioned that the tangential distance between the channel walls may be of certain practical importance. If the distance is limited, the liquid volume enclosed between the walls will be smaller, whereby the liquid flow will be better checked. Thus, it is advantageous if the distance at radii over 0.15 m. is below 1 cm.

The closer the liquid, while moving through the channels, will come to the separation chamber 8, the more important it is that the condition for the invention is met, since if the liquid flow in the channels is calm, flocks which have been split, e.g. at the inlet, can form anew if they have sufficient time for it. However, as the distance between the walls of the channels increases as the radius increases, it is advantageous, in order to counteract this, according to the invention to increase the number of vanes and thus the number of channels with increasing radius.

By increasing the number of vanes N, which one is free to do within reasonable limits, it is possible, with maintained value of the product NH, to reduce the height H of the channels and still let the product be greater than ¼ QW. As, further, the separating efficiency of a centrifugal separator is increased with the number of discs in the disc set and the number of discs is defined by the axial space which is at the disposal of the disc set, the invention implies the advantage that the space for the disc set and thus the number of discs can be increased by reducing H and increasing N.

The invention has been substantiated by empirical experiments. FIG. 6 illustrates experiments carried out with lime-water. On the horizontal axis the separating efficiency (throughput rate) is drawn in and on the vertical axis the turbidity produced in the liquid after the separation. The turbidity was measured by optical means and a turbidity of below 100 was necessary for a satisfactory separation.

Curve I shows the turbidity produced with a distributor of standard design with a small number of discharge channels of little height. Curve II shows the result given when the height of the channels was increased as much as permitted by the material thickness of the distributor. Curve III shows the result given when the number of the channels was doubled, and curve IV shows the result given when the height and number of the channels were further increased. It is noted that curve I has an appearance that is unnatural for a separtion result, with an abrupt increase of the turbidity at a definite value, whereas curve IV has a better appearance and gives a natural increase of the turbidity at increased output.

With a turbidity of 100, $v_1$ for curve I is above 5 m./sec., for curve II 4.5 m./sec., for curve III 3.5 m./sec. and for curve IV 2.1 m./sec. Thus, it is noted that by the mere fact of the speed $v_1$ being reduced from 4.5 to 3.5 m./sec., a considerable improvement of the separating efficiency is obtained and, consequently, the channels should be dimensioned so that $v_1$ is at least below 4 m./sec., advantageously below 3 m./sec. and preferably about 2.5 or 2 m./sec.

According to the invention the maximum total speed may thus be limited in such a way that it is within reasonable values and a high turbulence at the channel wall is avoided. If the separator is designed according to the invention still another form of turbulence is avoided. In general it is necessary to design a separator in such a way that the part 3 is detachable from the rotor body 4 and that the channel walls suitably are formed of vanes in the part 3. Often it is difficult to make these vanes seal completely against the bottom of the rotor body 4, especially if this is conical, and in that case a slot 13 may be formed between the vanes and the bottom of the rotor body, for example as is illustrated by FIG. 4. In this slot 13, a leakage flow arises as the difference between the pressures on either side of the channel wall, in complete entrainment, is p. The maximum value of this leakage flow is expressed by the Equation 5 for $v_1$ and through the invention also its size will be limited.

It may also be mentioned that at that edge of the vane 6 which is situated at the opening of the channel into the sludge chamber, the liquid will flow out, as appears from the above reasoning, at different speed, $v_a$ and $v_b$ respectively on either side of the vane 6. This is illustrated by FIG. 5 and this speed difference causes a speed gradient which is very detrimental because it furthers breaking of flocks. The size of this speed gradient is also dependent upon the value of $p$ and if $p$ is limited according to the invention, this speed gradient will decrease so that it gets a size that will be less detrimental to the flocks.

In the above figures and in the calculations, a bowl has been assumed in which the radial channels have had a direction in planes at right angles to the axis of rotation. In general, these channels lie in a direction along a conical surface. Decisive for the Coriolis-acceleration is, however, the flow speed component at right angles to the direction of rotation and for this reason the channel height H in the formula should of course be counted in the direction at right angles to the direction of this speed component which is in a direction parallel to the axis of rotation.

I claim:

The method of separating a mixture of a liquid and flocculating sludge in a rotary centrifugal bowl having a separating chamber, a mixture inlet located centrally of said chamber at the region of the rotation axis, a separated sludge outlet leading outward directly from the outer periphery of the chamber and a separated liquid outlet leading from the inner part of the chamber, said method comprising the steps of feeding the mixture radially outward from the inlet to said chamber at a rate of Q cubic meters per second while dividing the mixture into separately channeled radial streams which are N in number, N being greater than 20 but not exceeding 128, and which streams have an axial height of H meter, and simultaneously rotating the centrifugal bowl at an angular speed of W/sec. while fulfilling the conditions that WQ/4 is less than NH and the liquid pressure against the walls of the separate stream channels never exceeds a pressure corresponding to a liquid velocity in the channels of four meters per second.

References Cited in the file of this patent

UNITED STATES PATENTS

| 2,243,697 | Forsberg | May 27, 1941 |
| 2,628,021 | Staaff | Feb. 10, 1953 |

FOREIGN PATENTS

| 516,611 | Great Britain | Jan. 5, 1940 |